United States Patent Office 3,457,196
Patented July 22, 1969

3,457,196
POLYMERIZATION OF CYCLIC PHOSPHONITRILES WITH ORTHOPHOSPHATE ESTERS
David L. Herring and Catherine M. Douglas, Riverside, Calif., assignors to the United States of America as represented by the Secretary of the Navy
No Drawing. Filed Oct. 17, 1966, Ser. No. 588,264
Int. Cl. C07f *9/02;* C09d *3/48, 11/10*
U.S. Cl. 260—2      7 Claims

ABSTRACT OF THE DISCLOSURE

The preparation of polymers having chemical and hydrolytic stability by the reaction of difunctional cyclic phosphonitriles with alkyl orthophosphates.

---

The invention herein described may be manufactured and used by or for the Government of the United States of America for governmental purposes without the payment of any royalties thereon or therefor.

This invention relates to the preparation of new polymers from the reaction of difunctional cyclic phosphonitriles with alkyl orthophosphates.

These new polymeric materials which have improved thermal and hydrolytic stability are useful as laminating agents, coatings, adhesives and resins, and flame retardants.

It is an object of the invention to provide a process for preparation of new polymers having thermal and chemical stability.

Another object of the invention is to provide new polymeric materials having improved thermal and chemical stability.

Other objects and many of the attendant advantages of this invention will become readily appreciated as the same becomes better understood by reference to the following detailed description.

The preparation of starting materials: dichlorohexaphenylphosphonitrile tetramer, $(C_6H_5)_6Cl_2P_4N_4$, is described in copending U.S. patent application Ser. No. 483,884 filed Aug. 30, 1965 now abandoned, for Preparation of Heterosubstituted Phosphonitriles; dibromohexaphenylphosphonitrile tetramer, $(C_6H_5)_6Br_2P_4N_4$, is described in copending U.S. patent application Ser. No. 588,262, filed Oct. 17, 1966, for Dibromohexaphenylphosphonitrile Tetramer; difluorohexaphenylphosphonitrile tetramer, $(C_6H_5)_6F_2P_4N_4$, is described in copending U.S. patent application Ser. No. 588,265 filed Oct. 17, 1966, for Difluorohexaphenylphosphonitrile. Syntheses for dichlorohexaphenylphosphonitrile tetramer and dibromohexaphenylphosphonitrile tetramer are also disclosed in copending U.S. patent application Ser. No. 588,263, filed Oct. 17, 1966, for Preparation of Dihalohexaphenylphosphonitrile tetramers.

When an aforementioned difunctional phosphonitrile is reacted with trialkyl orthophosphates of the formula $(RO)_3PO$, two moles of alkyl halide are eliminated and a polymeric phosphonitrilic material results according to the following equation:

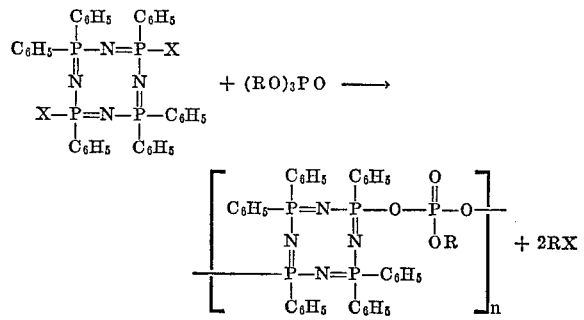

where R is alkyl and X is chlorine, bromine or fluorine.

As illustrated in the above equation, it is desirable that the tetrameric phosphonitrile and the orthophosphate be reacted in a 1:1 molar ratio. An excess amount of the phosphonitrile will result in crosslinking of the polymeric chains through the unreacted —OR group of the orthophosphate. If the stoichiometry is adjusted so the phosphate ester is present in excess, only low molecular weight polymers will be formed and as the ratio approaches 1:2, an increasing amount of the

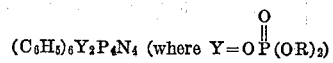

is formed.

The temperature of the reaction can be in the range of 150° C. to 250° C.; the pressure can be atmospheric or below atmospheric. It is sometimes advantageous to initiate the reaction at atmospheric pressure and subsequently to complete the reaction in vacuo to assure the removal of the alkyl halide which is evolved.

The trialkyl orthophosphates preferred as the ringlinking component in this reaction are those in which the alkyl group contains between 1 and about 10 carbon atoms. Typical examples of suitable trialkyl orthophosphates include trimethyl phosphate, triethyl phosphate, tripropyl phosphate, tributyl phosphate, triamyl phosphate, trihexyl phosphate, and the like.

As specific illustrations of the above process, the following examples are given.

EXAMPLE I

A mixture of 2.14 g. dichlorohexaphenylphosphonitrile tetramer and 0.55 g. of triethylorthophosphate were heated in vacuo at 150° C. for three hours. The temperature was gradually raised to 300° C. over a period of eight hours. During the heating cycle ethyl chloride was evolved (95% of theory) and was identified by its infrared spectrum. The resulting polymer melted over the range 125–145° C. This material was composed of units with the structure

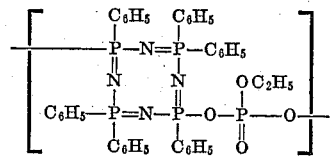

*Analysis.*—Calc. for $C_{38}H_{35}P_5N_4O_4$: C, 59.5; H, 4.6; P, 20.2; N, 7.3; O, 8.4. Found: C, 59.3; H, 4.6; P, 19.6; N, 7.5; O, 8.8.

EXAMPLE II

Dichlorohexaphenylphosphonitrile tetramer (3.56 g., 0.005 mole) and tripropyl orthophosphate (1.12 g., 0.005 mole) were heated at atmospheric pressure for six hours at 150–200° C. The reacation tube was then evacuated and the heating was continued for two hours. At the end of the reaction time, the temperature was raised to 250–270° C. for one hour. The product was a light yelow resin melting over the range 145–155° C.

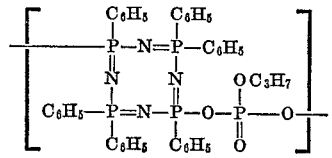

*Analysis.*—Calc. for $C_{39}H_{37}P_5N_4O_4$: C, 60.0; H, 4.7; P, 19.9; N, 7.2; O, 8.2. Found: C, 59.8; H, 4.7; P, 19.6; N, 7.1; O, 8.5.

EXAMPLE III

A mixture of $(C_6H_5)_6Cl_2P_4N_4$ (3.56 g., 0.005 mole) and tributyl orthophosphate (1.33 g., 0.005 mole) was heated at atmospheric pressure under a nitrogen blanket at 150–170° C. for four hours, then the reaction vessel was evacuated and the temperature was gradually raised to 275° C. The product was a yellow resin melting over the range 130–155° C.

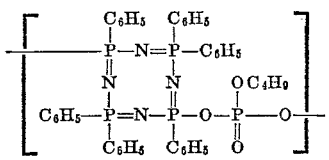

*Analysis.*—Calc. for $C_{40}H_{39}P_5N_4O_4$: C, 60.5; H, 4.9; P, 19.5; N, 7.1; O, 8.1. Found: C, 60.4; H, 4.8; P, 19.1; N, 6.9; O, 8.2.

Obviously many modifications and variations of the present invention are possible in the light of the above teachings. It is therefore to be understood that within the scope of the appended claims the invention may be practiced otherwise than as specifically described.

What is claimed is:

1. The polymer of the recurring unit formula

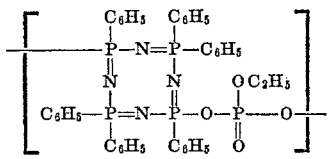

2. The polymer of the recurring unit formula

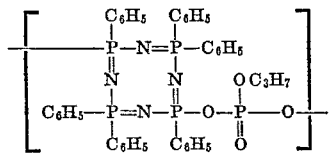

3. The polymer of the recurring unit formula

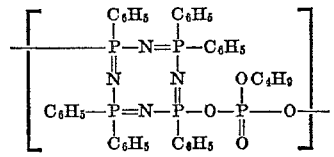

4. The process for preparing polymeric material having a recurring unit of the formula

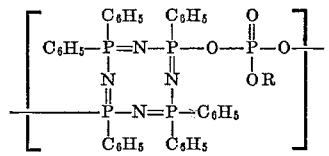

where R is an alkyl group having between 1 and about 10 carbon atoms, which comprises reacting one molar quantity of tetrameric dihalohexaphenylphosphonitrile of the formula

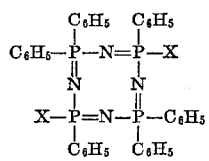

where X is selected from the group consisting of chlorine, bromine, and fluorine, with one molar quantity of a tri-alkyl orthophosphate of the formula $(RO)_3PO$, where R is an alkyl group having between 1 and about 10 carbon atoms at a temperature range of 150° C. to 250° C. and at atmospheric pressure and subsequent removal of the evolved alkyl halide in vacuo.

5. The process of claim 4 where R is $(C_2H_5)$.
6. The process of claim 4 where R is $(C_3H_7)$.
7. The process of claim 4 where R is $(C_4H_9)$.

References Cited

UNITED STATES PATENTS

| | | | |
|---|---|---|---|
| 3,164,556 | 1/1965 | Apley et al. | 260—2 |
| 3,347,877 | 10/1967 | Sharts | 260—2 |

FOREIGN PATENTS

| | | |
|---|---|---|
| 1,094,371 | 12/1967 | Great Britain. |
| 1,270,840 | 7/1961 | France. |
| 1,428,768 | 1/1966 | France. |

OTHER REFERENCES

Herring et al., "Inorganic Chemistry," vol. 4, No. 7, July 1965, pp. 1012–1016.

SAMUEL H. BLECH, Primary Examiner

U.S. Cl. X.R.

117—161; 156—331; 260—543, 927